E. A. SMITHFIELD.
CASTER CONSTRUCTION.
APPLICATION FILED FEB. 26, 1921.
1,383,774.
Patented July 5, 1921.
2 SHEETS—SHEET 1.
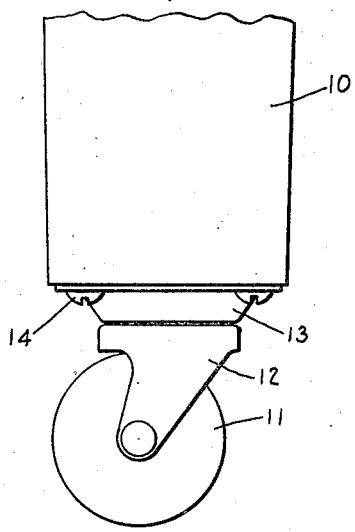
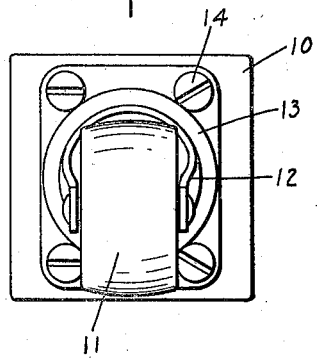
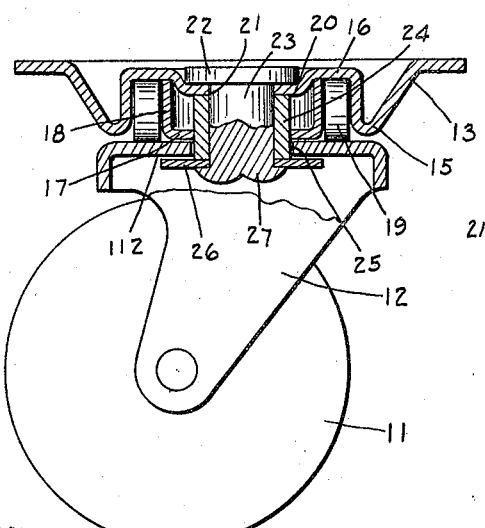
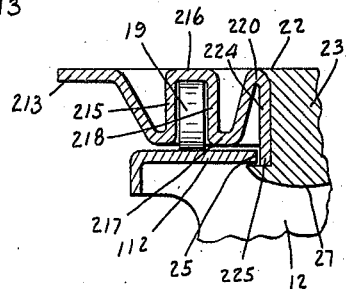
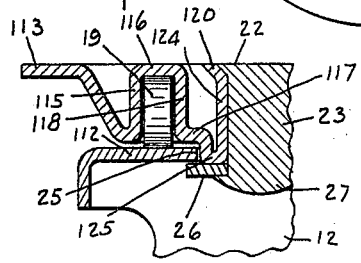
INVENTOR
EMIL A. SMITHFIELD,
BY
ATTORNEYS.

E. A. SMITHFIELD.
CASTER CONSTRUCTION.
APPLICATION FILED FEB. 26, 1921.
1,383,774.
Patented July 5, 1921.
2 SHEETS—SHEET 2.
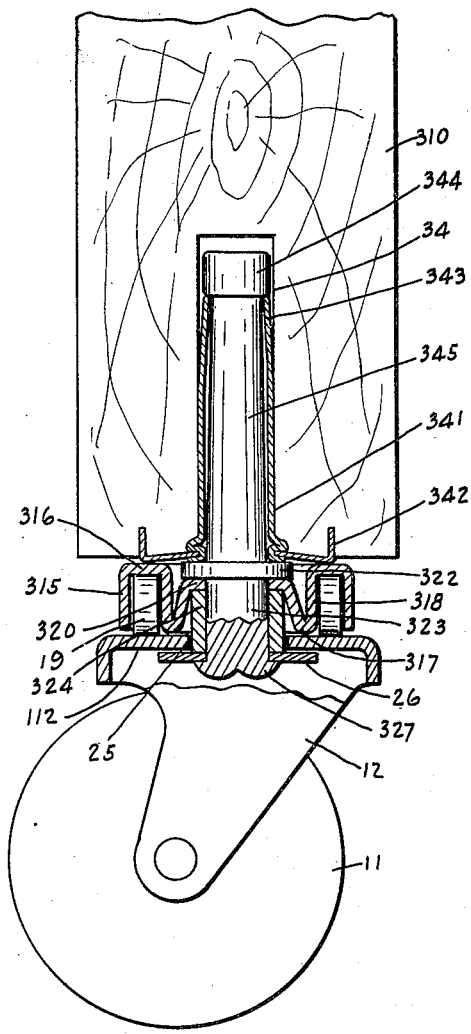
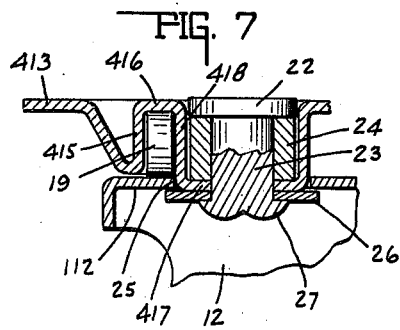
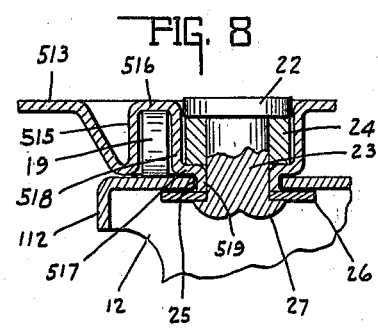
Inventor
EMIL A. SMITHFIELD.
By Lockwood Lockwood
Attorneys

UNITED STATES PATENT OFFICE.

EMIL A. SMITHFIELD, OF EVANSVILLE, INDIANA, ASSIGNOR TO FAULTLESS CASTER COMPANY, OF EVANSVILLE, INDIANA, A CORPORATION.

CASTER CONSTRUCTION.

1,383,774.      Specification of Letters Patent.      Patented July 5, 1921.

Application filed February 26, 1921. Serial No. 448,129.

*To all whom it may concern:*

Be it known that I, EMIL A. SMITHFIELD, a citizen of the United States, and a resident of Evansville, county of Vanderburg, and State of Indiana, have invented a certain new and useful Caster Construction; and I do hereby declare that the following is a full, clear, and exact description thereof, reference being had to the accompanying drawings, in which like numerals refer to like parts.

This invention relates to casters, and the chief object of the same is to improve the present roller bearing caster construction, whereby a rigid arrangement of several of the associated parts will be secured and whereby other parts will be swivelably mounted in an improved manner.

The chief feature of the invention consists in associating with a roller trackway and a yoke or horn a sleeve portion concentric with the usual stem, spindle or pivot.

The full nature of the invention will be understood from the accompanying drawings and the following description and claims.

In the drawings, Figure 1 is a side elevational view of a furniture leg to which the improved caster construction is secured. Fig. 2 is a bottom plan view of the same. Fig. 3 is an enlarged central sectional view of the invention showing the parts thereof in detail. Fig. 4 is an enlarged central sectional view of a portion of a modified form of the invention. Fig. 5 is an enlarged central sectional view of a portion of another modification of the invention. Fig. 6 is a central sectional view of a furniture leg to which the improved caster construction is secured, said caster construction, however, being slightly modified from that shown in Fig. 1, the generic idea of the invention being the same. Fig. 7 is a sectional view of a portion of a modified form of the invention differing slightly from that shown in Figs. 3, 4 and 5. Fig. 8 is a central sectional view of another modification of the invention and differs but slightly from Fig. 7.

In the drawings there is illustrated several forms of the invention, which is an improvement upon a prior patent issued to William H. Noelting, June 27, 1916, No. 1,888,674.

In the drawings 10 indicates the usual furniture leg, 11 the caster wheel and 12 the yoke or apron portion providing the yoke plate 112. The yoke 12 supports the furniture leg through suitable supporting means such as the socket construction 13, which is detachably secured to said leg by the usual screw or bolt means 14.

Reference will now be had to Fig. 3 wherein the invention is illustrated in detail. The socket forming plate 13 is provided with a circular and outer flange or guard 15 and a circular trackway portion 16. Associated with said outer circular guard is an inner cup member 17 provided with a circular flange portion 18 which is concentric with the outer flange portion 15 and coöperates with said flange portion and the trackway 16 to form a raceway adapted to receive the usual rollers 19. The plate 13 is further provided with a depressed central portion 20 provided with a central aperture 21. Seatable in the depression in the plate 13 is the head or enlargement 22 of a spindle or rivet 23, the body portion of which extends through the central opening 21 of the socket plate 13. A sleeve or bushing 24, which may be either solid or split, is positioned concentrically upon the spindle or rivet 23 and its upper edge bears against the central plate forming portion 20. The sleeve 24 extends through the cup 17 and terminates beyond the lower edge of the yoke plate 112. The horn or yoke plate 112 is provided with a central opening 25, and said yoke is rotatably supported upon said sleeve. It will be understood that when the yoke is in engagement with the rollers 19, said sleeve extends through the yoke and projects a short distance beyond the same. A washer 26 is positioned upon the spindle 23 adjacent the lower end of the sleeve 24, and said washer extends outwardly therefrom and beneath the yoke 112 to support the same upon the spindle at such times when the weight is removed from the caster, thereby securing said yoke to the caster socket. The rivet 23 is suitably upset, crimped or otherwise fastened or secured, as at 27, such that the washer 26, sleeve 24 and plate portion 20 are rigidly connected together, whereby an improved construction and arrangement is secured.

While the one form of the invention has been described in detail, it will be understood that several modifications thereof are possible without departing from the generic idea, which is to provide a sleeve portion surrounding the spindle, which sleeve portion terminates beyond the yoke portion when the latter is in bearable relation with the supporting rollers and means associated with said sleeve portion and limited in position thereby such that said yoke portion will be retained upon the spindle when the weight supported by the caster is removed therefrom. It will also be readily apparent that the spindle may be extended beyond the flange or head portion above the track plate to form a caster stem which may be formed as desired and seatable in suitable socket means if desired without departing from the broader features of this invention.

Two modifications suggested in the preceding paragraph are illustrated in Figs. 4 and 5. In Fig. 4 the yoke 12 provided with the yoke plate 112 and central aperture is positioned adjacent a supporting trackplate comprising a securing portion 113, a pair of concentric and parallel circular or cylindrical walls 115 and 118 designating respectively the outer and inner walls of a roller raceway in which the rollers 19 are retained. The rollers 119 are bearable upon a circular track portion 116 and upon the yoke plate 112. In Fig. 4 the inner wall 118 extends inwardly at 117 and downwardly at 125 into the central opening 25 of the yoke plate 112 and projects therethrough when said yoke plate is in bearable relation with the rollers. A washer 26 of greater diameter than the central opening 25 is positioned beneath the yoke plate and is bearable upon the depending seat 125 when the head 27 of the rivet or stud 23 is enlarged to retain said parts in assembled relation. The depending seat 125 extends upwardly to form a central sleeve portion 124 and terminates in a cup portion 120 for securing the head 22 of the rivet in the stud 23.

In Fig. 5 the portions and parts 213, 215, 216, 217, 218, 112, 23, 22, 27, 12 and 19 are substantially similar to the correspondingly numbered parts and portions in Figs. 3 and 4. In this modification the inwardly extending portion 217 extends diagonally upward to form a seat 220 for the rivet head 22 and then extends downwardly to form a sleeve portion 224 and terminates at 225 in a projecting portion extending through the central opening 25. The head of the rivet bears on the end 225 and secures the yoke 12 to the track plate without the use of a washer, as illustrated. A washer may be used, however, in the same manner as illustrated in Figs. 3 and 4.

In Fig. 6 there is illustrated a caster construction which is somewhat similar to that hereinbefore illustrated but differs somewhat therefrom, although the generic idea of the invention is retained herein. In said figure, 310 indicates a furniture leg with a central opening 340, and in said central opening is secured a cylindrical socket 341 which is provided with a base portion 342 and tongue portions 343 for engaging the head 344 of a neck between the head 344 and the body portion 345 of a caster stem. The stem 345 carries near its lower end a flange 322, and beneath said flange is a spindle portion 323, which spindle portion is adapted to be upset or otherwise enlarged at 327. Associated with the plate 342 is an upper track plate having an outer depending circular wall 315, an upper track portion 316 and a bearing porion 320 which seats the flange 322. Within the circular guard 315 is another circular guard portion 318, which is concentric therewith, and between said guard portions is positioned the rollers 19. The inner circular guard portion 318 extends inwardly at 317 and is adapted to lie parallel to the yoke plate 112 of the yoke 12, which yoke is centrally apertured at 25. A sleeve 324, either split or solid, is adapted to bear against the lower face of the seating portion 320 and to extend through the central opening 25 of the yoke plate 112 and beyond the lower face of said yoke plate. Adjacent the lower end of the bushing or sleeve 324 is positioned a washer 26, and it is to be understood that the free end of the spindle or stem is upset or enlarged at 327 to retain said washer, sleeve and upper track plate by means of said upset or enlarged portion and the flange 322 in rigid relation. It will be noted that Figs. 3 and 6 are substantially identical with the exception of the mounting of the caster upon the furniture leg and the inner retaining means.

Fig. 7 illustrates another form of the invention which eliminates the use of a separable inner retaining guard member, and in said figure the head or flange portion 22 is adapted to bear upon the sleeve 24 concentric with the spindle portion 23 of the rivet. Associated with the spindle 23 is the enlargement 27 thereof and the washer 26. The yoke plate 112 of the yoke 12 is centrally apertured as usual at 25, and said washer 26 is of greater diameter than the diameter of said central opening. The track plate 413 is provided with the outer circular portion 415, the upper trackway or bearing portion 416 and the inner circular portion 418. The inner circular portion, as shown in Fig. 7, extends downwardly into the central opening 25 and then extends inwardly at 417 to lie between the washer 27 and the bushing or sleeve 24 so that said sleeve 24, track plate 413 and washer 26 will be rigidly secured together upon the spindle, yet will permit the similar retaining of the yoke 112 upon the spindle construction.

In Fig. 8 another modification of said invention is illustrated, and herein the rivet, spindle or stem having the head 22, body portion 23 and enlargement 27, is substantially identical with that hereinbefore disclosed, and associated therewith is the usual sleeve or bushing portion 24. The yoke plate 112 of the yoke 12 is also centrally apertured at 25, and associated with said central aperture is the washer 26, as shown. The rollers 19 are bearable upon the yoke plate 112 when in bearable relation and are retained in the trackway 513 by means of the upper bearing portion 516, the outer retaining portion 515 and the inner retaining portion 518. Herein the inwardly extending portion 517 extends downwardly at 519 into the central opening 25. From the foregoing, it will be understood that the sleeve portion 24, washer 26 and plate 513 are all secured in rigid relation with the spindle, and said spindle construction freely and rotatably supports the yoke of the caster.

The invention claimed is:

1. A caster construction comprising a supporting spindle, an upper track plate having an outer depending circular guard portion, a sleeve on said spindle and bearing on said track plate adjacent its connection with the spindle, an inner circular guard member supported upon said sleeve and associated with said outer guard portion to form a circular trackway, rollers in said trackway, and a wheel supporting yoke carried on said rollers and rotatably supported upon said sleeve, the latter extending through said yoke and terminating beyond the same, whereby said trackway and spindle will form a rigid construction and said yoke will be freely supported thereon in rotatable relation.

2. A caster construction comprising a supporting spindle, an upper track plate having an outer depending circular guard portion, a sleeve on said spindle and having its upper end bearing on said track plate adjacent its connection with the spindle, an inner circular guard member supported upon said sleeve and associated with said outer guard portion to form a circular trackway, rollers in said trackway, a wheel supporting yoke carried by said rollers and rotatably supported upon said sleeve, the latter extending through the yoke and terminating beyond the same, and washer means positioned adjacent the lower end of said sleeve and bearable thereon, said spindle, trackway, sleeve and washer being secured in rigid relation, and said washer in spaced relation with said yoke when the latter is in the supporting position.

3. A caster construction comprising a spindle having two enlarged portions, circular trackway supporting means including concentric guard portions and an inner sleeve portion rigid with the trackway when in assembled relation and concentric with said spindle, and a wheel supporting yoke rotatably supported upon said sleeve portion.

4. A caster construction comprising a spindle, circular trackway supporting means including a plate portion, rollers for said trackway, a sleeve concentric with said spindle, a wheel supporting yoke rotatably supported upon said sleeve and carried by said rollers, and a washer upon said spindle adjacent the lower end of said sleeve and in spaced relation with said yoke when the latter is in the roller engaging position, said spindle, washer, sleeve and plate portion being rigidly secured together to form a trackway and a pivot.

In witness whereof, I have hereunto affixed my signature.

EMIL A. SMITHFIELD.